United States Patent
Mun et al.

(10) Patent No.: US 9,953,647 B2
(45) Date of Patent: Apr. 24, 2018

(54) METHOD AND APPARATUS FOR SPEECH RECOGNITION

(71) Applicant: Samsung Electronics Co., Ltd., Suwon-si (KR)

(72) Inventors: Minyoung Mun, Seoul (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 14/993,439

(22) Filed: Jan. 12, 2016

(65) Prior Publication Data

US 2016/0210965 A1    Jul. 21, 2016

(30) Foreign Application Priority Data

Jan. 19, 2015   (KR) ........................ 10-2015-0008713

(51) Int. Cl.
*G10L 15/22*    (2006.01)
*G10L 15/32*    (2013.01)
*G10L 21/0216*  (2013.01)

(52) U.S. Cl.
CPC .............. *G10L 15/22* (2013.01); *G10L 15/32* (2013.01); *G10L 21/0216* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,219,645 B1* | 4/2001 | Byers | G10L 15/02 381/91 |
| 6,353,814 B1 | 3/2002 | Weng | |
| 6,389,010 B1* | 5/2002 | Kubler | G06F 1/1626 370/353 |
| 6,408,272 B1* | 6/2002 | White | G10L 15/30 704/270.1 |
| 6,937,980 B2 | 8/2005 | Krasny et al. | |
| 7,016,836 B1* | 3/2006 | Yoda | G10L 15/20 455/563 |
| 7,516,068 B1* | 4/2009 | Clark | G10L 15/20 704/231 |
| 8,612,212 B2 | 12/2013 | Riccardi | |
| 9,384,751 B2* | 7/2016 | Venkatesha | G10L 15/22 |

(Continued)

FOREIGN PATENT DOCUMENTS

JP   2010-56762 A    3/2010
JP   2012-203122 A   10/2012

(Continued)

OTHER PUBLICATIONS

Hershey, J. et al., "Super-human multi-talker speech recognition: A graphical modeling approach," Computer Speech & Language, 24.1, 2010 (pp. 45-66).

*Primary Examiner* — Pierre-Louis Desir
*Assistant Examiner* — Jonathan Kim
(74) *Attorney, Agent, or Firm* — NSIP Law

(57) ABSTRACT

A method and apparatus for speech recognition are provided. The method and the apparatus calculate signal to noise ratios (SNRs) of speech signals from a user received at speech recognition apparatuses. The method and the apparatus recognize a reference speech signal having a maximum SNR among the SNRs.

19 Claims, 4 Drawing Sheets

(56) References Cited

U.S. PATENT DOCUMENTS

| | | | |
|---|---|---|---|
| 9,472,205 B2* | 10/2016 | Kolavennu | G10L 21/16 |
| 2002/0143532 A1* | 10/2002 | McLean | G10L 15/30 |
| | | | 704/235 |
| 2003/0130852 A1* | 7/2003 | Tanaka | H04M 1/05 |
| | | | 704/275 |
| 2004/0117179 A1* | 6/2004 | Balasuriya | G10L 15/32 |
| | | | 704/231 |
| 2005/0065790 A1* | 3/2005 | Yacoub | G10L 15/32 |
| | | | 704/231 |
| 2006/0080105 A1* | 4/2006 | Lee | G10L 15/30 |
| | | | 704/270.1 |
| 2007/0127421 A1* | 6/2007 | D'Amico | H04W 72/005 |
| | | | 370/338 |
| 2009/0022090 A1* | 1/2009 | Ayoub | H04W 40/04 |
| | | | 370/328 |
| 2009/0238377 A1* | 9/2009 | Ramakrishnan | G10L 21/028 |
| | | | 381/92 |
| 2009/0248411 A1 | 10/2009 | Konchitsky et al. | |
| 2009/0299745 A1* | 12/2009 | Kennewick | G10L 15/22 |
| | | | 704/257 |
| 2010/0208662 A1* | 8/2010 | Fuste Vilella | H04W 40/00 |
| | | | 370/328 |
| 2011/0191101 A1* | 8/2011 | Uhle | G10L 21/0208 |
| | | | 704/205 |
| 2012/0054527 A1* | 3/2012 | Pfeifer | G06F 1/266 |
| | | | 713/340 |
| 2012/0232896 A1* | 9/2012 | Taleb | G10L 25/78 |
| | | | 704/233 |
| 2012/0320143 A1 | 12/2012 | Chu et al. | |
| 2013/0029684 A1* | 1/2013 | Kawaguchi | H04R 3/005 |
| | | | 455/456.1 |
| 2013/0073293 A1* | 3/2013 | Jang | G10L 15/22 |
| | | | 704/275 |
| 2013/0090921 A1 | 4/2013 | Liu et al. | |
| 2013/0300546 A1* | 11/2013 | Kim | G08C 19/00 |
| | | | 340/12.22 |
| 2014/0188463 A1* | 7/2014 | Noh | G10L 15/00 |
| | | | 704/201 |
| 2014/0343935 A1* | 11/2014 | Jung | G10L 15/20 |
| | | | 704/233 |
| 2015/0078600 A1* | 3/2015 | Rasmussen | H04R 25/405 |
| | | | 381/318 |
| 2015/0088501 A1* | 3/2015 | Recker | H04R 25/43 |
| | | | 704/235 |
| 2015/0095026 A1* | 4/2015 | Bisani | G10L 15/08 |
| | | | 704/232 |
| 2015/0106085 A1* | 4/2015 | Lindahl | G10L 15/32 |
| | | | 704/231 |
| 2015/0117674 A1* | 4/2015 | Meachum | H04L 65/1069 |
| | | | 381/94.1 |
| 2015/0142447 A1* | 5/2015 | Kennewick | G10L 15/1822 |
| | | | 704/275 |
| 2015/0149167 A1* | 5/2015 | Beaufays | G10L 15/26 |
| | | | 704/235 |
| 2015/0207912 A1* | 7/2015 | Gulliksson | H04M 1/7253 |
| | | | 455/418 |
| 2015/0228274 A1* | 8/2015 | Leppanen | G10L 15/20 |
| | | | 704/243 |
| 2015/0380010 A1* | 12/2015 | Srinivasan | H04R 1/406 |
| | | | 704/227 |
| 2016/0203828 A1* | 7/2016 | Gomez | G10L 15/20 |
| | | | 704/226 |

FOREIGN PATENT DOCUMENTS

| | | |
|---|---|---|
| JP | 2014-72835 A | 4/2014 |
| KR | 10-0405099 B1 | 2/2004 |
| KR | 10-0655491 B1 | 12/2006 |
| KR | 10-0774519 B1 | 11/2007 |

* cited by examiner

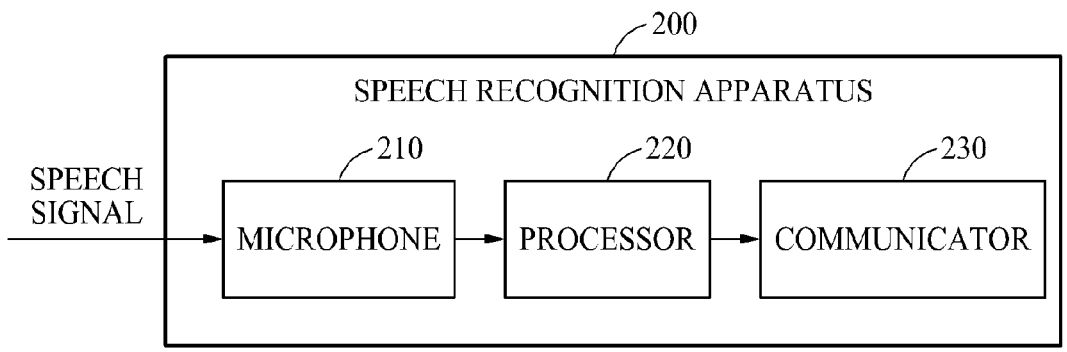
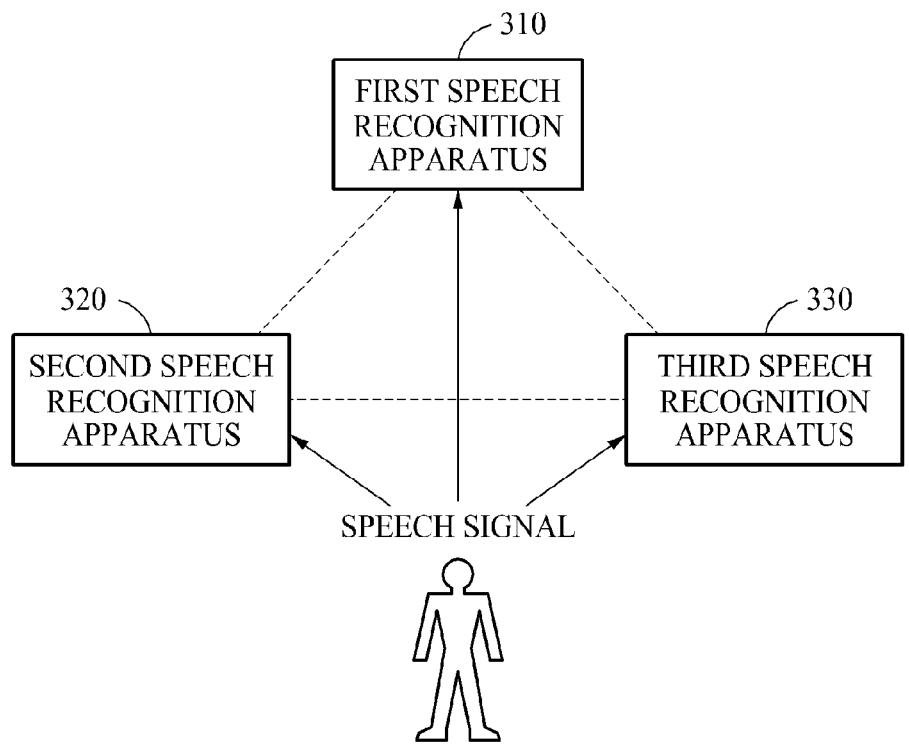

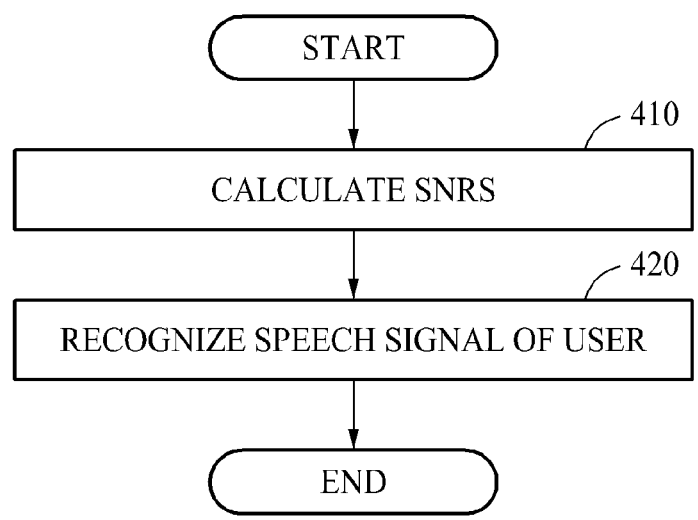

METHOD AND APPARATUS FOR SPEECH RECOGNITION

CROSS-REFERENCE TO RELATED APPLICATION(S)

This application claims the benefit under 35 USC 119(a) of Korean Patent Application No. 10-2015-0008713, filed on Jan. 19, 2015, in the Korean Intellectual Property Office, the entire disclosure of which is incorporated herein by reference for all purposes.

BACKGROUND

1. Field

The following description relates to a method and apparatus for speech recognition.

2. Description of Related Art

A speech interface is a more natural and intuitive interface than a touch interface. The speech interface makes human interaction with computers possible through a voice/speech platform in order to initiate an automated service or process. The speech interface is the interface to any speech application. Pocket-size devices, such as PDAs r mobile phones, currently rely on small buttons for user input. Extensive button-pressing on devices with such small buttons can be tedious and inaccurate, so an easy-to-use, accurate, and reliable speech interface is a breakthrough in the ease of their use. Also, speech interface would also benefit users of laptop- and desktop-sized computers, as well, as it would solve numerous problems currently associated with keyboard and mouse use, including slow typing speed on the part of inexperienced keyboard users. Thus, the speech interface is gaining attention as a next-generation interface that may compensate for flaws found in the touch interface. The core of the speech interface is accuracy in a speech recognition technology. Accordingly, various methods of enhancing the accuracy of speech recognition technology have been proposed and the speech recognition technology has been gradually developed.

However, an optimal performance in the speech recognition technology may not be easily achieved when a user is distant from a speech recognition apparatus or when a speech signal is received in a noisy environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a speech recognition method, including calculating signal to noise ratios (SNRs) of speech signals from a user received at speech recognition apparatuses; and recognizing a reference speech signal having a maximum SNR among the SNRs.

The calculating of the SNRs may include calculating the SNRs by separating noise and a speech of the user comprised in the speech signals.

The recognizing of the reference speech signal may include determining a speech recognition apparatus to recognize the reference speech signal among the speech recognition apparatuses based on an amount of available resources of a reference speech recognition apparatus receiving the reference speech signal; and recognizing the reference speech signal in the speech recognition apparatus.

The recognizing of the reference speech signal may include recognizing the reference speech signal in the reference speech recognition apparatus in response to the amount of available resources being greater than a threshold value.

The recognizing of the reference speech signal may include transmitting a feature value extracted from the reference speech signal or the reference speech signal to another speech recognition apparatus in response to the amount of available resources being less than the threshold value; and recognizing the speech signal in the another speech recognition apparatus.

The calculating of the SNRs may include, when an speech recognition apparatus of which a battery condition is less than a threshold value is present among the speech recognition apparatuses, calculating an SNR by transmitting a speech signal received at the speech recognition apparatus of which the battery condition is less than the threshold value to another speech recognition apparatus.

The speech recognition apparatus having the maximum SNR is determined by another speech recognition apparatus having received the SNRs from the speech recognition apparatuses or a communication among the speech recognition apparatuses.

The method may also include determining whether the user issues a command to any speech recognition apparatus among the speech recognition apparatuses; and receiving the speech signals through the speech recognition apparatuses in response to a determination that the user issues the command to any speech recognition apparatus among the speech recognition apparatuses.

The method may include verifying a user command by recognizing the speech signals and transmitting the user command to an speech recognition apparatus corresponding to the command, wherein the speech recognition apparatus corresponding to the command executes the command.

The speech recognition apparatuses are positioned at different positions adjacent to the user.

The speech recognition apparatuses may correspond to objects in an Internet of Things (IoT) environment.

The speech recognition apparatuses may include at least one of a smartphone, a smart television, a smart watch, a smart washing machine, a smart camera, a smart audio, a smart bicycle, smart glasses, a remote controller, a smart refrigerator, a smart air conditioner, a laptop, a personal digital assistant (PDA), and a tablet.

In accordance with an embodiment, there is provided a non-transitory computer-readable storage medium comprising a program comprising instructions to cause a computer to perform the method described above.

In accordance with an embodiment, there is provided a speech recognition apparatus, including a microphone configured to receive a reference speech signal from a user; and a processor configured to recognize the reference speech signal in response to a signal to noise ratio (SNR) calculated from the speech signal being greater than an SNR of the speech signal received at another speech recognition apparatus.

The processor may be configured to calculate the SNR by separating a noise and a speech of the user comprised in the reference speech signal.

The processor may be configured to determine whether the reference speech signal is to be recognized based on an amount of available resources or by transmitting the reference speech signal to the another speech recognition apparatus.

The processor may be configured to recognize the reference speech signal in response to the amount of available resources being greater than a threshold value.

The processor may be configured to transmit a feature value extracted from the reference speech signal or the reference speech signal to the another speech recognition apparatus in response to the amount of available resources being less than a threshold value, and the another speech recognition apparatus is configured to recognize the reference speech signal.

The processor may be configured to determine whether the user issues a command to the speech recognition apparatus or to the another speech recognition apparatus, and the microphone is configured to receive the reference speech signal in response to a determination that the user issues the command to the speech recognition apparatus or to the another speech recognition apparatus.

The speech recognition apparatus may be configured to correspond to an object in an Internet of Things (IoT) environment.

In response to the SNR being a high reference speech signal, the processor may perform speech recognition at a high recognition rate.

In response to a battery condition of the speech recognition apparatus being less than a threshold value, the speech recognition apparatus may transmit a speech signal to another speech recognition apparatus in lieu of directly calculating the SNR of the speech signal.

The another speech recognition apparatus may include a battery condition better than the speech recognition apparatus or disposed closest to the speech recognition apparatus.

Other features and aspects will be apparent from the following detailed description, the drawings, and the claims.

BRIEF DESCRIPTION OF THE DRAWINGS

FIG. 2 is a diagram illustrating an example of a speech recognition apparatus, in accordance with an embodiment.

FIG. 3 is a diagram illustrating an example of recognizing a speech signal of a user through a plurality of speech recognition apparatuses, in accordance with an embodiment.

FIG. 4 is a diagram illustrating an example of a speech recognition method, in accordance with an embodiment.

Figure 1:
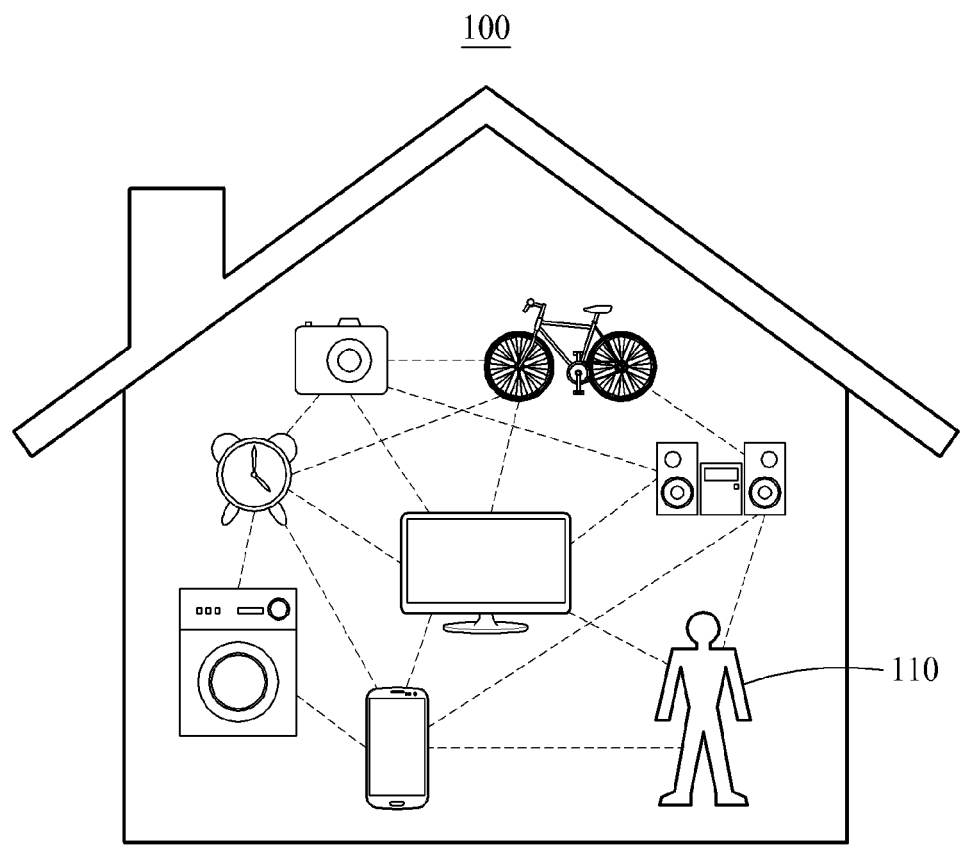
FIG. 1 is a diagram illustrating an example of an environment in which a speech recognition apparatus operates, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of an environment in which a speech recognition apparatus operates, in accordance with an embodiment.

The speech recognition apparatus is an apparatus to recognize a speech signal of a user. The speech recognition apparatus extracts a feature value from the speech signal of the user and generates a text corresponding to a speech recognition result from the feature value based on an acoustic model and a language model. The speech recognition apparatus may be provided in a single structural module or various structural modules to perform speech recognition, such as a processor or processors, respectively. The single structural module or the various structural modules configuring the speech recognition apparatus may be provided in a single hardware module or a plurality of hardware modules, respectively.

Provided that a device process speech signals of a user, the speech recognition apparatus is not limited to a particular type of device. The speech recognition apparatus may be included in structural devices such as a smartphone, a smart television, a smart watch, a smart washing machine, a smart camera, a smart audio, a smart bicycle, smart glasses, a remote controller, a smart refrigerator, a smart air conditioner, a laptop, a personal digital assistant (PDA), and a tablet. In addition, a communication function is added to the speech recognition apparatus and the speech recognition apparatus is connected to a communication network. Thus, the speech recognition apparatus is also configured to share information between the various structural devices.

Referring to FIG. 1, the aforementioned speech recognition apparatus or apparatuses configure a speech recognition system 100. The speech recognition system 100 receives a speech signal from a user 110 through a single speech recognition apparatus or a plurality of speech recognition apparatuses and performs speech recognition.

For example, the speech recognition system 100 speech recognition apparatuses to recognize a speech signal from the user 110 received by any apparatus among the speech recognition apparatuses. In this example, the speech recognition system 100 identifies a reference speech signal that includes a most accurate speech of the user 110 among speech signals received by the speech recognition apparatuses and performs the speech recognition on the reference speech signal.

The speech recognition apparatuses are positioned in different positions adjacent to or near the user 110. Thus, the speech signals received by the speech recognition apparatuses include different amounts of noise surrounding the speech recognition apparatuses. In the alternative, the speech recognition apparatuses receive different amounts of speech from the user 110 based on adjacent environments in which the speech recognition apparatuses are disposed.

For example, the speech recognition system 100 illustrated in FIG. 1 corresponds to an Internet of Things (IoT) environment in which objects in life are connected via a wired or wireless network to share information. The speech recognition apparatuses included in the speech recognition system 100 correspond to the objects in the IoT environment.

FIG. 2 is a diagram illustrating an example of a speech recognition apparatus, in accordance with an embodiment.

Referring to FIG. 2, a speech recognition apparatus 200 includes a microphone 210, a processor 220, and a communicator 230.

The microphone 210 receives a speech signal from a user. For convenience of description, a speech signal received by the speech recognition apparatus 200 will be hereinafter referred to as a reference speech signal, thereby distinguishing from a speech signal received at another speech recognition apparatus.

In one example, the microphone 210 is provided as an ultra low power sensor and always operates in ON mode to receive a reference speech signal. In another example, the microphone 210 receives the reference speech signal by switching an OFF mode to an ON mode in response to the speech recognition apparatus 200 being plugged-in. In a further example, the microphone 210 receives the reference speech signal by switching from a sleep mode to an ON mode in response to a triggering signal received from another speech recognition apparatus. In addition, when determining that the user is issuing a command to the speech recognition apparatus or to another speech recognition apparatus through the processor 220, the microphone 210 receives the reference speech signal by switching from the sleep mode to the ON mode.

The processor 220 calculates a signal to noise ratio (SNR) of the reference speech signal. The SNR is a ratio of noise and the reference speech signal corresponding to the speech of the user to be recognized. The higher a value of the SNR is indicative of a lower amount of noise included in the reference speech signal. Accordingly, when the SNR is a high reference speech signal, the processor 220 performs speech recognition at a high recognition rate.

In this example, the SNR of the speech signal tracks the speech of the user included in the reference speech signal. Also, the SNR of the speech signal is calculated by separating the speech of the user from an external factor, such as noise. The aforementioned method performed at the processor 220 is referred to as a speech tracking and separation. The processor 220 separates the speech of the user from a speech signal by identifying a fundamental frequency of the speech. Based on the aforementioned method, even when speech from two users are included in a speech signal, the speech from the two users may be separated from the reference speech signal by identifying fundamental frequencies associated with each speech. However, scope of calculating an SNR of a speech signal is not limited to the aforementioned example. The SNR may be calculated using various methods of calculating an SNR of a speech signal. To identify the fundamental frequency associated with the speech of the user, in one example, during initialization of the speech recognition apparatus 200, the processor 220 receives a reference speech signal associated with the user and identifies and stores a fundamental frequency associated with the reference speech signal to be used to identify the fundamental frequency from all of fundamental frequencies associated with received speech or noise. In an embodiment, the processor 220 may be re-configured to identify a fundamental frequency associated with a reference speech signal of another user.

In another example, a target speech to be speech recognized may be input to the speech recognition apparatus 200 in advance, or defined by the speech recognition apparatus 200 when a user continuously uses the speech recognition apparatus 200. For example, the speech recognition apparatus 200 analyzes a received reference speech signal and defines a speech of a user included in a most frequently identified reference speech signal as a target speech.

The processor 220 determines whether an SNR of a reference speech signal is greater than an SNR of a speech signal of a user received at another speech recognition apparatus. In an example, the processor 220 compares magnitudes of SNRs by receiving an SNR calculated in another speech recognition apparatus based on a communication with another speech recognition apparatus. In another example, the processor 220 transmits a calculated SNR to a predetermined speech recognition apparatus and receives a comparing result of SNRs.

When the SNR of reference speech signal is greater than the SNR of a speech signal of the user received at another speech recognition apparatus, the processor 220 recognizes the reference speech signal. For example, the processor 220 determines whether speech recognition is to be performed at another speech recognition apparatus or the speech recognition is to be performed in the speech recognition apparatus 200 based on an amount of available resources. The processor 220 recognizes the reference speech signal, in response to the amount of available resources being greater than a predetermined threshold value. In response to the amount of available resources being less than the predetermined threshold value, the processor 220 makes a determination to perform the speech recognition at another speech recognition apparatus and transmits a feature value extracted from the reference speech signal or the reference speech signal to the another speech recognition apparatus.

The communicator 230 communicates with other speech recognition apparatuses. For example, the communicator 230 transmits a calculated SNR, a reference speech signal, a feature value extracted from the reference speech signal, and other signals to the another speech recognition apparatus. Conversely, the communicator 230 receives a calculated SNR, a reference speech signal, a feature value extracted from the reference speech signal, and other signals from the another speech recognition apparatus.

FIG. 3 is a diagram illustrating an example of recognizing a speech signal of a user through a plurality of speech recognition apparatuses, in accordance with an embodiment.

Referring to FIG. 3, speech recognition system includes a first speech recognition apparatus 310, a second speech recognition apparatus 320, and a third speech recognition apparatus 330. The first speech recognition apparatus 310, the second speech recognition apparatus 320, and the third speech recognition apparatus 330 receive a speech signal from a user through an included microphone, perform speech recognition and SNR calculation through a processor, for example the processor 220, and perform communication with another apparatus through a communicator, for example the communicator 230.

For ease of description, a speech signal received from the first speech recognition apparatus 310 is referred to as a first speech signal, a speech signal received from the second speech recognition apparatus 320 is referred to as a second speech signal, and a speech signal received from the third speech recognition apparatus 330 is referred to as a third speech signal. Although FIG. 3 illustrates that three speech recognition apparatuses are included in the speech recognition system for ease of description, this is to be understood as a non-limiting example. The speech recognition system includes at least one speech recognition apparatus.

The first speech recognition apparatus 310, the second speech recognition apparatus 320, and the third speech recognition apparatus 330 receive a speech signal from a user, for example, "move to a previous channel". The first speech recognition apparatus 310, the second speech recognition apparatus 320, and the third speech recognition apparatus 330 calculate SNRs of the speech signal received from the user, respectively. In this example, the first speech recognition apparatus 310, the second speech recognition apparatus 320, and the third speech recognition apparatus 330 determine whether the respective SNRs of the received speech signals to be directly calculated based on a condition of battery.

For example, when a battery condition of the first speech recognition apparatus 310 is less than a predetermined threshold value, the first speech recognition apparatus 310 transmits a first speech signal to another speech recognition apparatus in lieu of directly calculating the SNR of the first speech signal. Another speech recognition apparatus having received the first speech signal calculates the SNR of the first speech signal. In this example, another speech recognition apparatus may be one of the second speech recognition apparatus 320 and the third speech recognition apparatus 330 that has a battery condition relatively good or disposed closest to the first speech recognition apparatus 310.

The speech recognition system identifies a speech signal having a maximum SNR among the calculated SNRs. For example, the first speech recognition apparatus 310, the second speech recognition apparatus 320, and the third speech recognition apparatus 330 identifies a speech signal having a maximum SNR based on intercommunication. Alternatively, an apparatus that a user selected or pre-defines as a main apparatus among the first speech recognition apparatus 310, the second speech recognition apparatus 320, and the third speech recognition apparatus 330 identifies a reference speech signal having a maximum SNR by receiving the calculated SNR. For example, when a maximum SNR among the calculated SNRs is an SNR of the first speech signal, the speech recognition system identifies the first speech signal as a reference speech signal. In an alternative configuration, the apparatus may be pre-selected as a main apparatus by the speech recognition system using a priority order.

The speech recognition system performs speech recognition on the first speech signal as a reference speech signal. For example, the first speech recognition apparatus 310 determines whether speech recognition is to be performed in another speech recognition apparatus or the speech recognition is to be performed directly based on whether an amount of available resources is greater than a predetermined threshold value. In response to the amount of available resources of the first speech recognition apparatus 310 being greater than the predetermined threshold value, the first speech recognition apparatus 310 performs the speech recognition on the first speech signal. Conversely, in response to the amount of available resources of the first speech recognition apparatus 310 being less than the predetermined threshold value, the first speech recognition apparatus 310 performs the speech recognition in another speech recognition apparatus by transmitting a feature value extracted from the first speech signal or the first speech signal to the another speech recognition apparatus. In this example, another speech recognition apparatus is one of the second speech recognition apparatus 320 and the third speech recognition apparatus 330 of which an amount of available resources is relatively large or is disposed at a relatively short distance from the first speech recognition apparatus 310.

The first speech recognition apparatus 310 performs speech recognition, and the first speech recognition apparatus 310 verifies that a user command is "move to a previous channel" and the user command corresponds to the second speech recognition apparatus 320, for example, a smart television (TV). The first speech recognition apparatus 310 transmits the user command to the second speech recognition apparatus 320 and the second speech recognition apparatus 320 executes the user command "move to a previous channel."

The first speech recognition apparatus 310, the second speech recognition apparatus 320, and the third speech recognition apparatus 330 receive a speech signal "check a new e-mail" from the user. The first speech recognition apparatus 310, the second speech recognition apparatus 320, and the third speech recognition apparatus 330 calculate SNRs of a corresponding received reference speech signal from the user and identify a third speech signal from the reference speech signal having the maximum SNR.

In response to an amount of available resources of the third speech recognition apparatus 330 being greater than the predetermined threshold value, the third speech recognition apparatus 330 performs speech recognition on the third speech signal and verifies that the user issues a command "check a new e-mail" and the user command corresponds to the first speech recognition apparatus 310. The third speech recognition apparatus 330 transmits the user command to the first speech recognition apparatus 310 and the first speech recognition apparatus 310 executes the user command "check a new e-mail." Based on an amount of the reference speech signal from the user included in the first speech signal or the SNR of the first speech signal, when the user determines that verifying a command executing result is difficult, although a distance between the user and the first speech recognition apparatus 310 is not short or the user command is executed in the first speech recognition apparatus 310, the speech recognition apparatus 310 transmits the command executing result to the second speech recognition apparatus 320, for example, a smart TV, and the second speech recognition apparatus 320 displays a new e-mail.

FIG. 4 is a diagram illustrating an example of a speech recognition method, in accordance with an embodiment.

The speech recognition method is performed in at least one processor in the one or more speech recognition apparatuses.

In operation 410, the speech recognition apparatuses calculate received SNRs of speech signals from a user. The speech recognition apparatuses calculate the SNRs by separating noise and a speech included in the speech signals. Further, when one of the speech recognition apparatuses of which a battery condition is less than a predetermined threshold value is present among the speech recognition apparatuses, another speech recognition apparatus of the speech recognition apparatuses with a battery condition greater than the predetermined threshold calculates an SNR of speech signal by transmitting the speech signal received at the one of the speech recognition apparatuses.

In operation 420, the speech recognition apparatuses identify a reference speech signal having a maximum SNR among the calculated SNRs. For example, the one or more speech recognition apparatuses transmit the calculated SNRs to any apparatus selected as a main apparatus among the speech recognition apparatuses and identify the reference speech signal based on the main apparatus. Alternatively, the speech recognition apparatuses identify the reference speech signal based on communication with each other.

A reference speech signal is recognized by one of the one or more speech recognition apparatuses. For example, speech recognition is performed in a reference speech recognition apparatus having received the reference speech signal. However, the speech recognition on the reference speech signal may be performed by another speech recognition apparatus which is not a reference speech recognition apparatus, in response to an amount of resources of the reference recognition apparatus being less than a predetermined threshold value. In this example, another speech recognition apparatus may perform the speech recognition based on a feature value extracted from the reference speech signal or the reference speech signal received by the reference speech recognition apparatus.

Figure 5:
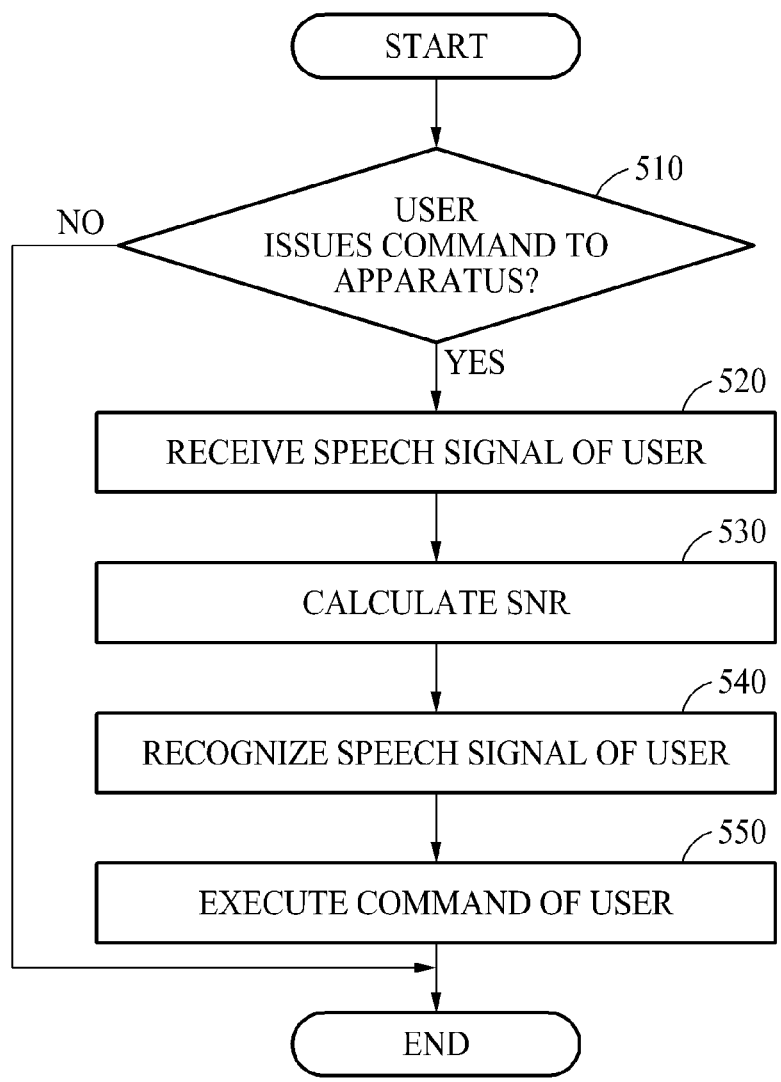
FIG. 5 is a diagram illustrating another example of a speech recognition method, in accordance with an embodiment.

FIG. 5 is a diagram illustrating another example of a speech recognition method, in accordance with an embodiment.

The speech recognition method is performed in a processor included in any speech recognition apparatus.

In operation 510, a speech recognition apparatus determines whether a user issues a command to an apparatus among speech recognition apparatuses included in speech recognition system. For example, a speech recognition apparatus of the speech recognition apparatuses determines that the user issues a command when a speech signal from the user is determined to correspond to a predetermined command, when the speech recognition apparatus detects a predetermined action or command from the user, or when a speech recognition result with respect to the speech signal from the user is determined to be a command with respect to the speech recognition apparatus.

Conversely, when the speech signal of the user is determined not to correspond to the predetermined command, the speech recognition apparatus terminates an ongoing operation and determines whether the user is to issue a command to any apparatus among the speech recognition apparatuses.

In operation 520, the speech recognition apparatus receives a speech signal of a user. Hereinafter, for ease of description, a speech signal from a user received at the speech recognition apparatus is referred to as a reference speech signal.

In operation 530, the speech recognition apparatus calculates an SNR of the reference speech signal. For example, the speech recognition apparatus calculates the SNR by separating noise and a speech of the user included in the reference speech signal.

In operation 540, the speech recognition apparatus recognizes the reference speech signal in response to the SNR of the reference speech signal being greater than an SNR of speech signal received by another speech recognition apparatus. Speech recognition is performed on the reference speech signal in another speech recognition apparatus in response to an amount of resources of the speech recognition apparatus being less than a predetermined threshold value. In this example, the speech recognition apparatus transmits a feature value extracted from the reference speech signal or the reference speech signal to another speech recognition apparatus.

In operation 550, the speech recognition apparatus verifies a user command based on a speech recognition result. In response to a determination that the user command corresponds to the speech recognition apparatus, the speech recognition apparatus executes the user command. Conversely, in response to a determination that the user command corresponds to another speech recognition apparatus, the speech recognition apparatus transmits the user command to another speech recognition apparatus so that the user command is to be executed in the another speech recognition apparatus.

Accuracy in speech recognition may be effectively enhanced by performing speech recognition on a speech signal having a maximum SNR among speech signals received by the speech recognition apparatuses.

Availability in a smart device included in an IoT environment is enhanced by providing service of recognizing a speech signal of a user based on the IoT environment including the speech recognition apparatuses. Although the description provided above pertaining to the speech recognition apparatuses are in an implementation of multiple speech recognition apparatuses, a person of ordinary skill in the art will appreciate that one speech recognition apparatus may be implemented to perform similar functions as those described above.

The apparatuses, units, modules, devices, processor, microphone, communicator, and other components illustrated in FIGS. 1-3 that perform the operations described herein with respect to FIGS. 4-5 are implemented by hardware components. Examples of hardware components include transmitters, receivers, controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4-5. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-5 that perform the operations described herein with respect to FIGS. 1-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented speech recognition method of a speech recognition apparatus, comprising:
   capturing a speech signal from a user;
   calculating a signal to noise ratio (SNR) of the captured speech signal;
   selectively recognizing the captured speech signal in response to the SNR of the captured speech signal being greater than an SNR of the speech signal received at another speech recognition apparatus among plural speech recognition apparatuses,
   wherein the selective recognizing of the captured speech signal includes:
      selecting between the speech recognition apparatus and the other speech recognition apparatus to recognize the captured speech signal based on a determined amount of available resources of the speech recognition apparatus, and
      transmitting, from the speech recognition apparatus, the captured speech signal or a feature value extracted from the captured speech signal to the other speech recognition apparatus in response to the determined amount of available resources being determined to fail to meet a threshold, so the recognizing of the captured speech signal is performed by the other speech recognition apparatus based on the captured speech signal or the extracted feature value.

2. The method of claim 1, wherein the calculating of the SNRs comprises calculating the SNR by separating noise and a speech of the user comprised in the captured speech signal.

3. The method of claim 1, wherein the speech recognition apparatus is selected to perform the recognizing of the captured speech signal in response to the amount of available resources being determined to meet the threshold.

4. The method of claim 1, wherein the calculating of the SNR comprises, when a battery condition of the speech recognition apparatus fails to meet another threshold value, transmitting the captured speech signal to the other speech recognition apparatus so the calculating of the SNR of the captured speech is performed by the other speech recognition apparatus.

5. The method of claim 1, wherein the SNR of the captured speech signal being greater than the SNR of the speech signal received at the other speech recognition apparatus is determined by the other speech recognition apparatus having received SNRs from the plural speech recognition apparatuses or a communication among the plural speech recognition apparatuses.

6. The method of claim 1, further comprising:
   determining whether the user issues a command to any speech recognition apparatus among the plural speech recognition apparatuses; and
   receiving the speech signals through the plural speech recognition apparatuses in response to a determination that the user issues the command to any speech recognition apparatus among the plural speech recognition apparatuses.

7. The method of claim 1, further comprising:
   verifying a user command based on the recognition of the captured speech signal and transmitting the user command to one of the plural speech recognition apparatuses corresponding to the command,
   wherein the one speech recognition apparatus corresponding to the command executes the command.

8. The method of claim 1, wherein the plural speech recognition apparatuses are positioned at different positions with respect to the user.

9. The method of claim 1, wherein the plural speech recognition apparatuses correspond to objects in an Internet of Things (IoT) environment.

10. The method of claim 1, wherein the plural speech recognition apparatuses comprises at least one of a smartphone, a smart television, a smart watch, a smart washing machine, a smart camera, a smart audio, a smart bicycle, smart glasses, a remote controller, a smart refrigerator, a smart air conditioner, a laptop, a personal digital assistant (PDA), and a tablet.

11. A non-transitory computer-readable storage medium comprising a program comprising instructions to cause a processor to perform the method of claim 1.

12. A speech recognition apparatus, comprising:
a microphone configured to capture a speech signal from a user; and
a processor configured to calculate a signal to noise ratio (SNR) of captured speech signal and selectively recognize the captured speech signal in response to the SNR of the captured speech signal being greater than an SNR of the speech signal received at another speech recognition apparatus among plural speech recognition apparatuses,
wherein the selective recognizing of the captured speech signal includes selecting between the speech recognition apparatus and the other speech recognition apparatus to recognize the captured speech signal based on a determined amount of available resources of the speech recognition apparatus, and
wherein the processor is configured to transmit the captured speech signal or a feature value extracted from the captured speech signal to the other speech recognition apparatus in response to the amount of available resources failing to meet a threshold so the recognizing of the captured speech signal is performed by the other speech recognition apparatus based on the captured speech signal or the extracted feature value.

13. The apparatus of claim 12, wherein the processor is configured to calculate the SNR by separating noise from speech of the user comprised in the captured speech signal.

14. The apparatus of claim 12, wherein, for the selective recognizing, the processor is configured to determine that the captured speech signal is to be recognized by the speech recognition apparatus when the determined amount of available resources of the speech recognition apparatus meets the threshold.

15. The apparatus of claim 12, wherein the processor is configured to transmit the extracted feature value to the other speech recognition apparatus in response to the amount of available resources failing to meet the threshold.

16. The apparatus of claim 12, wherein the processor is configured to determine whether the user issues a command to the speech recognition apparatus or to any of the plural speech recognition apparatuses, and the microphone is configured to capture the speech signal in response to a determination that the user issues the command.

17. The apparatus of claim 12, wherein the speech recognition apparatus is configured to correspond to an object in an Internet of Things (IoT) environment.

18. The apparatus of claim 12, wherein, in response to the SNR being a high speech signal, the processor performs speech recognition at a high recognition rate.

19. The apparatus of claim 14, wherein, when the other speech recognition apparatus indicates a battery condition better than a battery condition of the speech recognition apparatus or the other speech recognition apparatus is indicated to be disposed closer to the user than the speech recognition apparatus, the determined amount of available resources of the speech recognition apparatus is determined to fail to meet the threshold.

* * * * *